UNITED STATES PATENT OFFICE.

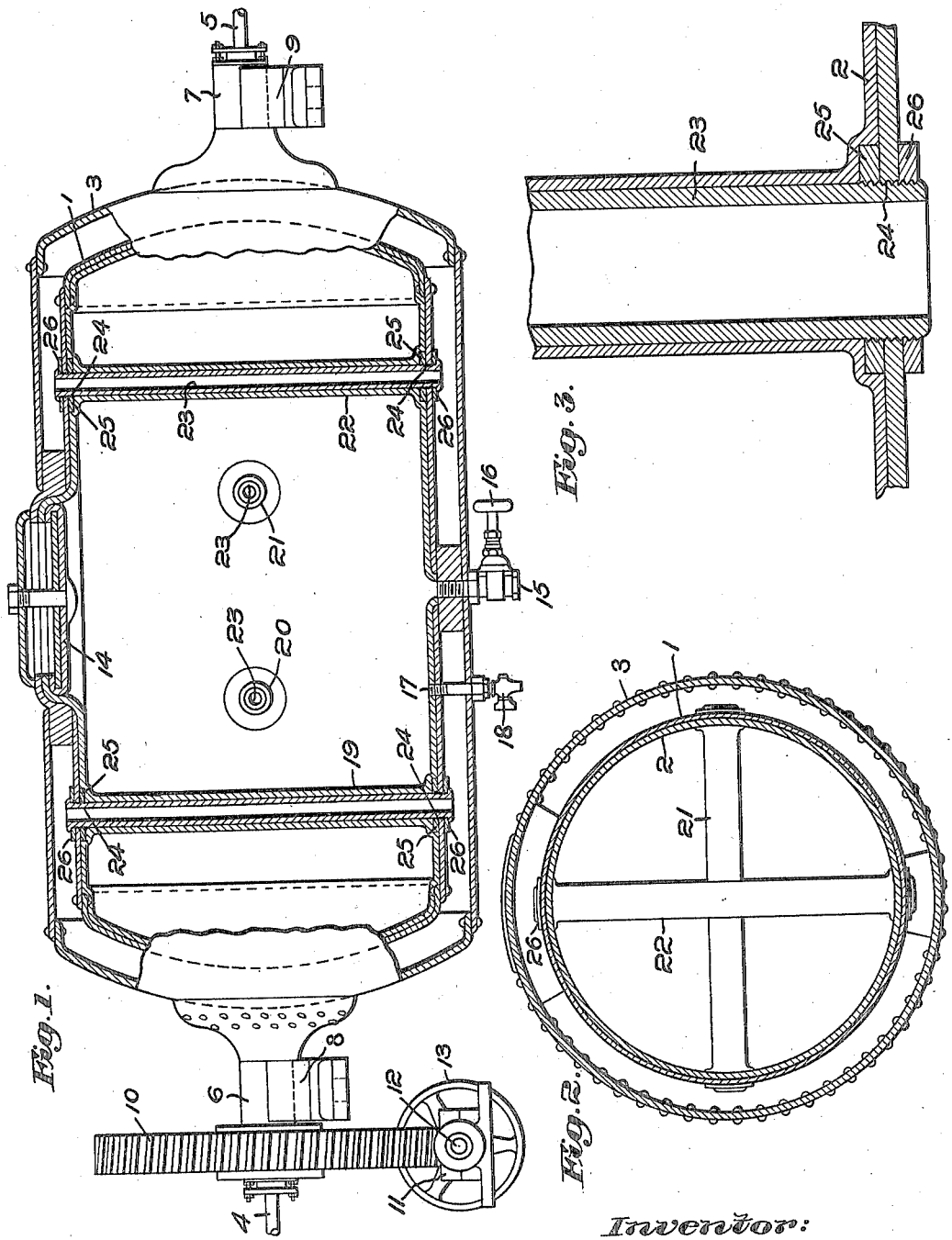

WILLIAM W. McLAURIN, OF BROOKFIELD, MASSACHUSETTS.

DEXTRIN.

1,284,120.   Specification of Letters Patent.   Patented Nov. 5, 1918.

Application filed June 22, 1916. Serial No. 105,270.

*To all whom it may concern:*

Be it known that I, WILLIAM W. Mc-LAURIN, a subject of the King of Great Britain, and a resident of Brookfield, in the county of Worcester and State of Massachusetts, have invented an Improvement in Dextrin, of which the following description, in connection with the accompanying drawings, is a specification, like characters on the drawings representing like parts.

This invention relates to improvement in dextrin.

In order that the principle of the invention may be readily understood, I shall describe one embodiment of apparatus by which the product of my invention may be manufactured and the best mode known to me for effecting such manufacture and the characteristics of the resulting product.

In the ordinary process of producing dextrin by the conversion of starch, by the wet process, starch and water with a small quantity of hydrochloric, sulfuric, acetic or other suitable acid is placed in an open vessel and the ingredients are stirred. At the same time steam is injected into the mass which in addition to supplying heat thereto adds an uncertain quantity of water. After the point of conversion is reached the fluid is concentrated and eventually substantially all of the moisture is evaporated, thus producing a comparatively hard material which requires the addition of water to reduce it to a consistency for use as an adhesive or for other purposes to which commercial dextrin is adapted.

In carrying my invention to practice one of my principal objects is to produce a dextrin ready to use as an adhesive or for other purposes without the addition of water. This requires that during the operation of my process the dextrin should have a greater degree of concentration than during the processes heretofore employed and at which degree of concentration, the conversion of the starch would not be completely accomplished without the assistance of certain steps in my process.

In carrying the process for manufacturing my improved dextrin into operation I utilize a vessel having a steam jacket, said vessel from its construction or operation being adapted to agitate or mix the contents thereof. Into this vessel I place approximately equal or suitable quantities of water and starch of any known kind and a small quantity of suitable acid mixed to form a cream. I next close the vessel and supply steam to the jacket thereof, whereby the temperature of the contents of the vessel is raised and ultimately pressure is generated in said vessel. I also operate the machine in any manner to effect the agitation or mixing of the contents whereby convection is assisted. This agitation of the materials tends to prevent the formation of the tough, rubbery material ordinarily occasioned by the partial hydrolyzing of the starch, so that as the conversion proceeds the mixture is rendered smooth and reaction of the fluid but comparatively syrupy mixture toward a rubbery condition is prevented, particularly after the critical temperature of 230° F is reached. After suitable conversion of the starch substantially at a point at which approximately 10% of sugar is present I arrest the process of conversion and reduce the temperature of the material.

The dextrin thus produced will contain a degree of acid which is not objectionable in many uses of the dextrin as an adhesive but for some purposes as when the dextrin is to be used as adhesive on delicate materials it is desired to neutralize the acid to some extent and this is accomplished in any known manner.

Referring more particularly to the drawings,—

Figure 1 is a vertical, longitudinal, central section embodying one form of apparatus by which dextrin may be manufactured in accordance with my invention;

Fig. 2 is a transverse section thereof; and

Fig. 3 is a detail in section upon an enlarged scale taken through one of the steam circulating pipes.

My invention relates to the manufacture of dextrin from starch, to which end I employ any suitable starch and water. The starch may be obtained from corn, potato, sago, tapioca, or any other desired or suitable material. In carrying out my process, I preferably take equal parts of starch and cold water, making them into a smooth cream, free from all lumps. To this, I add a suitable acid, preferably in a small amount. I have obtained excellent results by employing a one-thousandth part of concentrated hydrochloric acid (specific gravity 1.19); that is, one tenth of one per cent. of the weight of the starch. This may in some cases be somewhat increased, the maximum being substantially three tenths of one per cent. of the weight of the starch. These figures are illustrative merely and are not given for purposes of precise limitation. These ingredients may be mixed either outside of or within the conversion chamber represented in the accompanying drawings, and which I will now specifically describe.

The dextrins manufactured or produced in accordance with my invention are normally hydrolyzed: that is, are produced in one continuous chemical process by the action of acid and heat, water being present throughout the conversion. These conditions bring about products having chemical compositions capable of being defined by known laws of acid hydrolysis.

In the claims, reference is made to a dextrin solution or liquid having a concentration of substantially fifty per cent. By this I mean that the two substances, namely, starch and water, may be varied not more than about fifteen per cent. either way, as for example 65% starch and 35% water. Preferably, however, the said two substances are employed in substantially equal quantities within narrower limits.

The said conversion chamber is herein represented as a closed vessel 1 of any suitable material having an acid resisting lining 2, preferably formed of lead. The said vessel is provided with a jacket 3 entirely surrounding the same for the reception of live steam which may be admitted through an inlet pipe 4 and discharged from an exit pipe 5. The said vessel is provided with trunnions 6, 7 received in or upon suitable bearings 8, 9, the steam inlet and exit pipes passing through said trunnions. I preferably rotate said vessel or digester, and herein for that purpose have represented a worm gear 10 fast on the trunnion 6 and meshing with and driven by a worm 11 on a shaft 12 having thereon fast and loose pulleys 13. The vessel or digester is provided with a man-hole 14 of any suitable construction and by means of which the described material may be placed within the vessel or digester. At some suitable point, and as herein shown, at a point opposite the man-hole 14, I provide a discharge opening 15 provided with a gate valve 16 by means of which the contents may be withdrawn as quickly as possible, so that when the process is finished, the material may be run off before further conversion thereof takes place. Preferably I provide a smaller opening 17 having a pet-cock 18 to permit the drawing off of samples of the liquid during the carrying out of the process. In this manner, I may determine at any time just what stage of the conversion has been reached. Either the steam inlet or the steam outlet pipe is provided with a suitable safety valve, pressure gage and thermometer, the construction being such that I may permit the blowing off of the steam very rapidly, so as quickly to reduce the pressure within the vessel at any desired stage in the carrying out of the process.

The vessel 1 is provided with any suitable number of pipes extending therethrough in any desired direction. I have in the drawings represented four pipes 19, 20, 21 and 22 respectively arranged in pairs at right angles to each other. These pipes are lined with lead or other suitable acid-resisting material, as indicated at 23. As indicated most clearly in Fig. 3, the lead or other lining for the pipes may be continuous with the lead lining 2. I have herein represented each of said pipes as having threaded ends 24 receiving nuts 25, 26 for securing them in position.

The said pipes perform the double purpose of assisting the breaking up of the material and the mixing thereof during the rotation of the vessel or digester, and also the bringing of the steam into more intimate relation with the mass within the vessel or digester. It is to be understood, however, that the steam within the jacket or pipes does not come in direct contact with the material. The said pipes therefore assist in the uniform conversion of the material. Any suitable number of pipes may be employed, and their arrangement may be varied within the scope of my invention.

The illustrative digester constitutes the preferred embodiment of means for producing my product, but any other suitable means may be employed for this purpose.

I have previously stated that preferably equal parts of starch and cold water are mixed, and that I add a preferably small quantity of hydrochloric acid. The vessel is closed after being charged with said material, and by the introduction of steam through the inlet pipe 4, the heat is raised as quickly as possible, preferably to 284° F. (140° C.) with preferably substantially fifty-two and a half pounds steam pressure. I am not, however, limited to such steam pressure. The heat is retained at this temperature for a suitable length of time, which is preferably one-half or three-quarters of an hour, or until the test samples drawn off by the pet-cock 18 show the proper degree of conversion. When the desired conversion is obtained, the temperature is reduced as rapidly as possible by blowing off the steam within the jacket 3 and at the same time reducing the pressure within the vessel or digester, said pressure being caused by the heating of the water mixed with the starch. The dextrin thus obtained is a free flowing, mobile solution, and is immediately ready for use, it being a solution or liquid. It is found to be liquid at ordinary temperatures; say 60 to 70° F. Commercial dextrins with which I am familiar are dry powders and must be dissolved in use.

I have ascertained that when the temperature reaches about 230° F., the composition suddenly thins out or liquefies, and can be much more readily mixed. It is not essential to my product that the temperature be raised to 284° F., but by doing so, I save time and expediate the process. Until the temperature rises to about 230° or 232° F., the composition is a thick, rubbery, highly viscous mass, which it is substantially impossible to work mechanically without destruction of the mixing apparatus. As above stated, at about 230° F. the material becomes comparatively thin and can be easily stirred or otherwise mechanically mixed. This action occurs with the minimum amount of acid.

In the carrying out of my process, no steam is allowed to enter into the material. I thereby obviate an irregular or uneven conversion, as where live steam at high pressure is employed, as in certain processes heretofore practised, that portion of the starch immediately in the path of the steam is over converted, with the resulting production of glucose rather than dextrin. Furthermore, the injection of live steam directly into the material causes more or less dilution of the charge. This is contrary to an important object of my invention, which is the production of a concentrated solution ready for immediate use, as an adhesive, without further treatment, such, for example, as concentration by evaporation heretofore practised.

In the usual processes of converting starch, mainly into glucose, under pressure of steam, not only is the steam injected directly into the starch solution or suspension, but a higher proportion of water to starch is invariably used, so far as I am aware, together with much more concentrated acid. Therefore, the dextrin solution must be evaporated or concentrated, and the acid neutralized before the dextrin is in condition for use. By my process, owing to the low proportion of water to starch and the small quantity of acid employed, I am enabled to omit both such steps, which heretofore have entailed much additional expense.

In accordance with the preferred embodiment of my invention and the best mode known to me for carrying out my process, I employ a jacketed vessel, and thereby obtain a high pressure upon the contents (starch, water and hydrochloric or other acid). As heretofore stated, I employ a low acid strength and obtain a dextrin solution of high concentration immediately available for use without further treatment, as an adhesive for envelop flaps, for gumming paper, for use as stickers, etc.

I may stop the process and withdraw the liquid at different and predetermined periods of time, and thus may stop the conversion at different stages thereof prior to the full conversion of the starch into dextrin. I may thus obtain a product or dextrin which is substantially free from starch and glucose; that is, a perfect dextrin. I may also obtain a product uniformly presenting throughout partially converted starch. It has heretofore been attempted to stop the conversion prior to the formation of a dextrin, free from starch and glucose, but the result heretofore has been a product that has not been uniform, a portion thereof being completely converted into dextrin and a portion thereof being in an incomplete stage of conversion; that is, still a starch.

So far as I am aware, I am the first to obtain a perfect dextrin and also to obtain products intermediate starch and perfect dextrin, but in each case of a uniform nature and consistency throughout. In the manner stated, I may so stop the process as to obtain a product having any desired percentage of unconverted starch, such product being of uniform consistency and nature throughout.

I have been enabled by my process to obtain with the utmost exactness the desired product, which may be a perfect dextrin or an incomplete dextrin, without difficulty and without variation. This result I obtain by continuing the process for different lengths of time under determined conditions of temperature and pressure. By practising my process for a fixed length of time of treatment, I may produce reliably and consistently a dextrin free or practically free from unconverted material and from glucose. This result is of the greatest importance, since the greatest possible adhesive power in dextrin is required. Any unconverted starch or glucose decreases the adhesive quality. I also obtain a fully converted dextrin whiter than so-called fully converted dextrin of other processes, and in fact as white as starch. My product is a colorless solution in contrast to the brown color of the usual so-called fully converted dextrin now upon the market.

In order to obtain a product which may be employed as an adhesive and which may be either a perfect dextrin or an incomplete dextrin, but of uniform consistency throughout, it is of great importance that I subject the material to a high pressure and employ a small quantity of acid. The amount of acid preferably employed is so nearly negligible that it is unnecessary to neutralize it after the completion of the process.

The effect of pressure is to accelerate conversion. Such pressure may result in an elevated temperature and thus indirectly cause conversion, or it may itself cause disruption of the starch molecules. The shell of the starch granules bursts when heated and liberates the starchy matter. The pressure employed hastens the breaking up of the said shell of the starch granules and probably hastens the breaking up of the starch molecules themselves. The proportion of acid to starch used in obtaining my product is very much less than is required in the practice of processes with the same conditions of temperature of which I am familiar, and may be only one third as much or less. It is important, however, that too high a pressure be avoided, as it results in charring. The factors controlling my product are temperature, pressure and acid concentration. If the water be varied in amount, the other factors being constant, the results vary. If I employ one-half as much water, I obtain a more fully converted product.

My product has various degrees of stiffness. I can obtain either a pure dextrin or a more or less converted starch. When partially converted, the entire material is partially converted and to a uniform extent, so that, as previously stated, the composition is homogeneous and uniform throughout. Heretofore a partially converted starch has contained more or less unchanged starch. I produce a product at a higher pressure than heretofore employed and in a water solution of a high concentration. By stopping the conversion at any point I may obtain either (1) a soluble starch, (2) a dextrin containing more or less starch but in a homogeneous condition throughout, or (3) a fully converted and perfect dextrin.

By my process, all the starch is converted into dextrin at a stage of hydrolysis at which the higher hydrolyzed products, namely, maltose and dextrose, are present, if at all, in such small quantities as to be negligible, the maltose, if present, being in the form of malto-dextrin.

I control the rate of speed of the process by employing a small amount of acid, so that the re-action goes on at a safe speed and enables me to remove the product from the apparatus before there is formed any undue proportion of after products.

The solution formed as the result of my process constitutes a paper coating which is substantially free from hydroscopic effects, owing to its essential freedom from the higher converted products ordinarily present in dextrin as made by the usual methods, namely, maltose and dextrose and their combinations.

The dextrin forming the subject-matter of this application is of better quality than any dextrin heretofore made so far as I am aware, because it is made by normal acid hydrolysis with a minimum amount of water,—less than heretofore used, and the dextrin consequently is ready for use with no secondary heating or with a minimum amount of secondary heating, which secondary heating is necessary for the concentration of a thinner product made by methods heretofore employed. The result is a product decidedly improved in homogeneity and color over dextrins made by other or usual methods. The dextrin is a ready-dissolved dextrin existing as an essentially stable solution adapted for transportation as such and is suitable without further treatment as a coating, adhesive or impregnation for paper, textiles, wood and the like. The dextrin of my invention has less than 10 per cent. sugar on the weight of the dry product. It is a highly concentrated solution or dextrin, and preferably it has a concentration of about fifty per cent, though the substances may vary ten per cent. either way. Thus, for example, I may use sixty per cent. starch and forty per cent. water.

Having thus described my invention, I desire it to be understood that although specific terms are employed, they are used in a generic and descriptive sense and not for purposes of limitation, the scope of the invention being set forth in the following claims.

No claim is made to the process above set forth as the same is reserved for and forms the subject-matter of my co-pending application, Serial No. 231,282, filed April 27, 1918.

Claims:

1. As an article of manufacture, a normally hydrolyzed ready-dissolved, substantially clear dextrin solution or liquid having a concentration of substantially fifty per cent. and suitable, without further treatment, as a coating, adhesive or impregnation for paper, textiles, wood and the like, made from commercially pure starch, of uniform quality throughout and having less than ten per cent. of sugar on the weight of the dry product.

2. As an article of manufacture, a normally hydrolyzed, substantially clear ready-dissolved dextrin solution or liquid having a concentration of about fifty per cent. and suitable, without further treatment, as a coating, adhesive or impregnation for paper, textiles, wood and the like, said solution or liquid being made from commercially pure starch and of uniform quality throughout.

3. As an article of manufacture, normally hydrolyzed, substantially clear, ready-dissolved dextrin consisting of a solution or liquid having a concentration of substantially fifty per cent. and suitable, without further treatment, as a coating, adhesive or impregnation for paper, textiles, wood and the like, made from commercially pure starch and of uniform quality throughout and having a minimum amount of sugar.

4. As an article of manufacture, a normally hydrolyzed, substantially clear, ready-dissolved dextrin solution or liquid having a concentration of substantially fifty per cent. and suitable, without further treatment, as a coating, adhesive or impregnation for paper, textiles, wood and the like, made from commercially pure starch, non-subjected to the direct action of steam, and of uniform quality throughout.

In testimony whereof, I have signed my name to this specification.

WILLIAM W. McLAURIN.